(12) United States Patent
Bai

(10) Patent No.: US 11,627,807 B2
(45) Date of Patent: Apr. 18, 2023

(54) CONNECTING STRUCTURE AND SEAT

(71) Applicant: QINGDAO CENTAURY DESIGN CO., LTD., Qingdao (CN)

(72) Inventor: Guifen Bai, Qingdao (CN)

(73) Assignee: QINGDAO CENTAURY DESIGN CO., LTD., Qingdao (CN)

( * ) Notice: Subject to any disclaimer, the term of this patent is extended or adjusted under 35 U.S.C. 154(b) by 0 days.

(21) Appl. No.: 17/978,004

(22) Filed: Oct. 31, 2022

(65) Prior Publication Data
US 2023/0062269 A1  Mar. 2, 2023

Related U.S. Application Data

(63) Continuation of application No. PCT/CN2022/072640, filed on Jan. 19, 2022.

(51) Int. Cl.
| A47C 4/02 | (2006.01) |
| A47C 7/42 | (2006.01) |
| A47C 7/54 | (2006.01) |
| F16B 12/26 | (2006.01) |
| A47C 7/02 | (2006.01) |

(52) U.S. Cl.
CPC ............ *A47C 4/021* (2013.01); *A47C 4/02* (2013.01); *A47C 4/028* (2013.01); *A47C 7/0213* (2018.08); *A47C 7/42* (2013.01); *A47C 7/546* (2013.01); *F16B 12/26* (2013.01)

(58) Field of Classification Search
CPC .. A47C 4/021; A47C 4/02; A47C 4/03; A47C 4/028; A47C 7/42; A47C 7/546; F16B 12/22; F16B 12/26; F16B 12/44; F16B 21/088; F16B 2012/046;
(Continued)

(56) References Cited

U.S. PATENT DOCUMENTS

| 5,511,893 A | * | 4/1996 | Kilgus ..................... H01H 3/10 |
| | | | 403/294 |
| 5,755,489 A | * | 5/1998 | Rossman ................. A47C 4/02 |
| | | | 297/440.16 |

(Continued)

FOREIGN PATENT DOCUMENTS

| CN | 1947611 A | 4/2007 |
| CN | 204541433 U | 8/2015 |

(Continued)

OTHER PUBLICATIONS

International Search Report for PCT/CN2022/072640, dated May 17, 2022.

*Primary Examiner* — Robert Canfield
(74) *Attorney, Agent, or Firm* — J.C. Patents

(57) ABSTRACT

A connecting structure and a seat. The connection structure comprises a mounting hole structure and a mounting structure correspondingly disposed on two main members to be connected; a step structure extends downwards and inwards on one side of the mounting hole structure, and two sides of the step structure are provided with limiting clamping points protruding in a direction parallel to an extending direction of the step structure; the mounting structure is configured to be a column structure, a bottom end of the column structure is provided with a shovel-shaped structure extending in one side of the column structure, and two sides of the shovel-shaped structure are provided with everted protrusions.

20 Claims, 17 Drawing Sheets

(58) Field of Classification Search
CPC ............. F16B 2012/466; F16B 220/10; Y10T 24/303; Y10T 24/309
USPC ............. 297/440.1, 440.13, 440.16, 440.23, 297/411.45, 451.8, 451.13, 452.11
See application file for complete search history.

(56) References Cited

U.S. PATENT DOCUMENTS

| | | |
|---|---|---|
| 5,988,755 A | 11/1999 | Fastelli |
| 6,957,865 B1 * | 10/2005 | Adams ................ A47B 91/024 297/344.12 |
| 9,408,469 B1 * | 8/2016 | Chiu ........................ A47C 4/02 |
| 10,857,954 B1 * | 12/2020 | Kumar ................ B60R 13/0243 |
| 2003/0129040 A1 | 7/2003 | Arisaka |
| 2010/0276971 A1 * | 11/2010 | Maxwell ................. A47C 4/02 297/440.13 |
| 2013/0287484 A1 | 10/2013 | Phillips |
| 2014/0341644 A1 * | 11/2014 | Maertens ............... F16B 21/086 403/297 |
| 2015/0375797 A1 * | 12/2015 | Morris ..................... B60R 13/04 24/605 |
| 2016/0353894 A1 * | 12/2016 | Hsu .......................... A47C 7/42 |
| 2019/0048907 A1 * | 2/2019 | Sugiyama ............. F16B 21/075 |
| 2022/0369815 A1 * | 11/2022 | Bock ........................ A47C 7/42 |

FOREIGN PATENT DOCUMENTS

| | | |
|---|---|---|
| CN | 105531486 A | 4/2016 |
| CN | 212698260 U | 3/2021 |
| EP | 1156226 A1 | 11/2001 |
| JP | 2020054432 A | 4/2020 |
| KR | 20130130422 A | 12/2013 |
| KR | 102246401 B1 | 4/2021 |

* cited by examiner

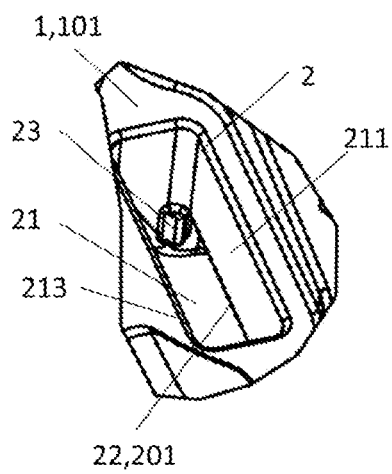
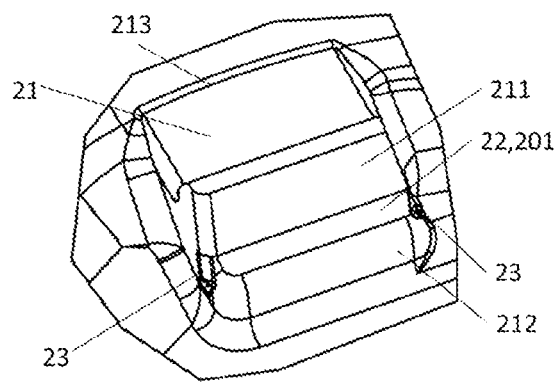
Fig. 1                Fig. 2
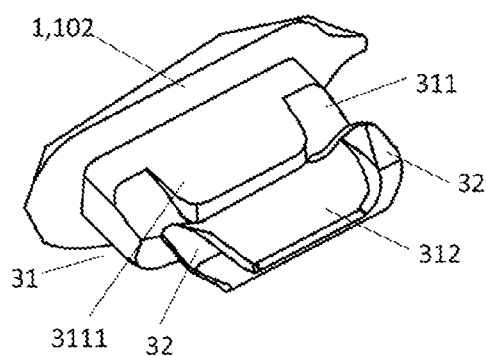
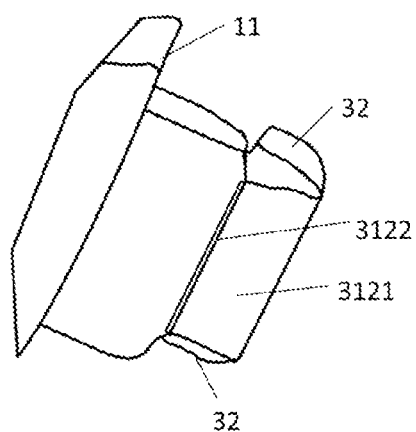
Fig. 3                Fig. 4
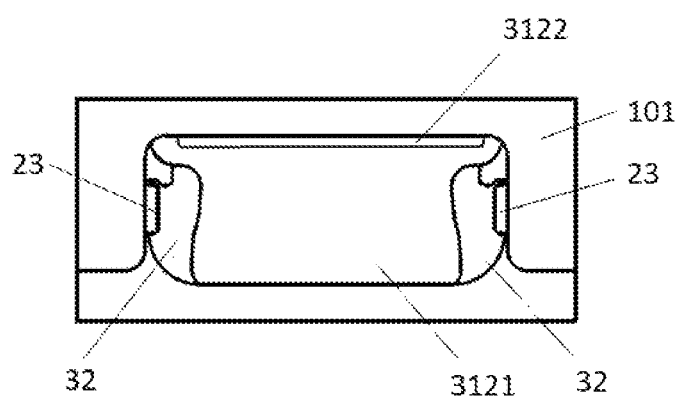
Fig. 5

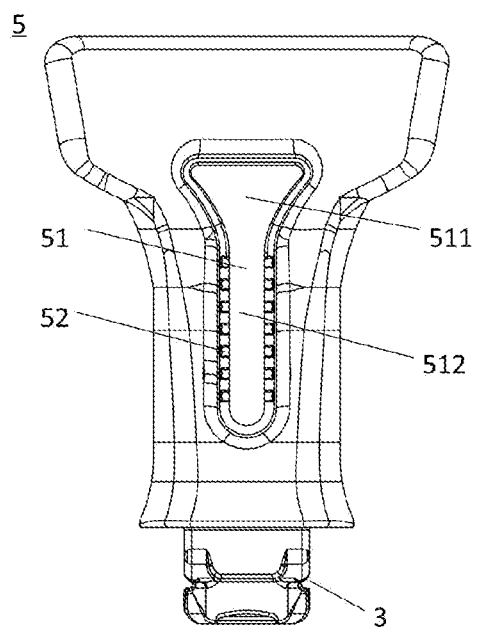
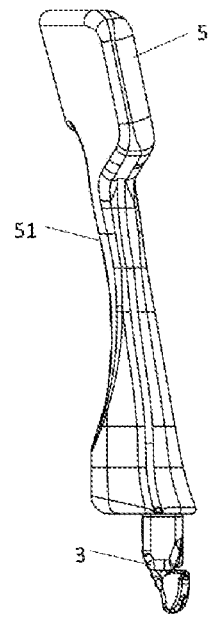
Fig. 26　　　　　　　　Fig. 27
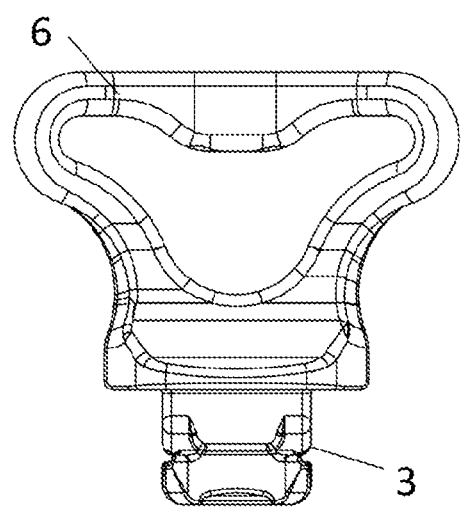
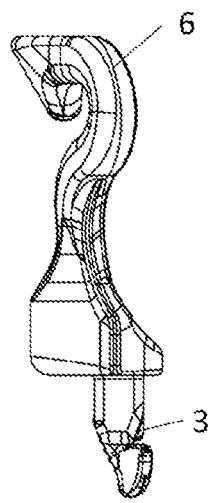
Fig. 28　　　　　　　　Fig. 29

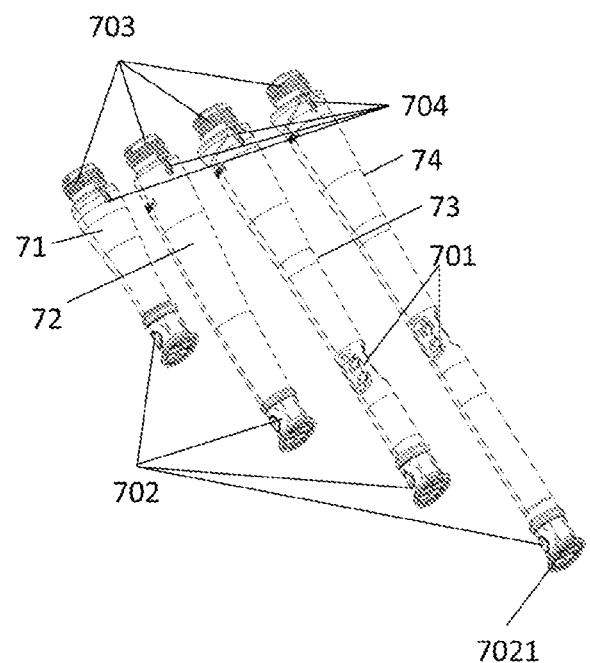
Fig. 30
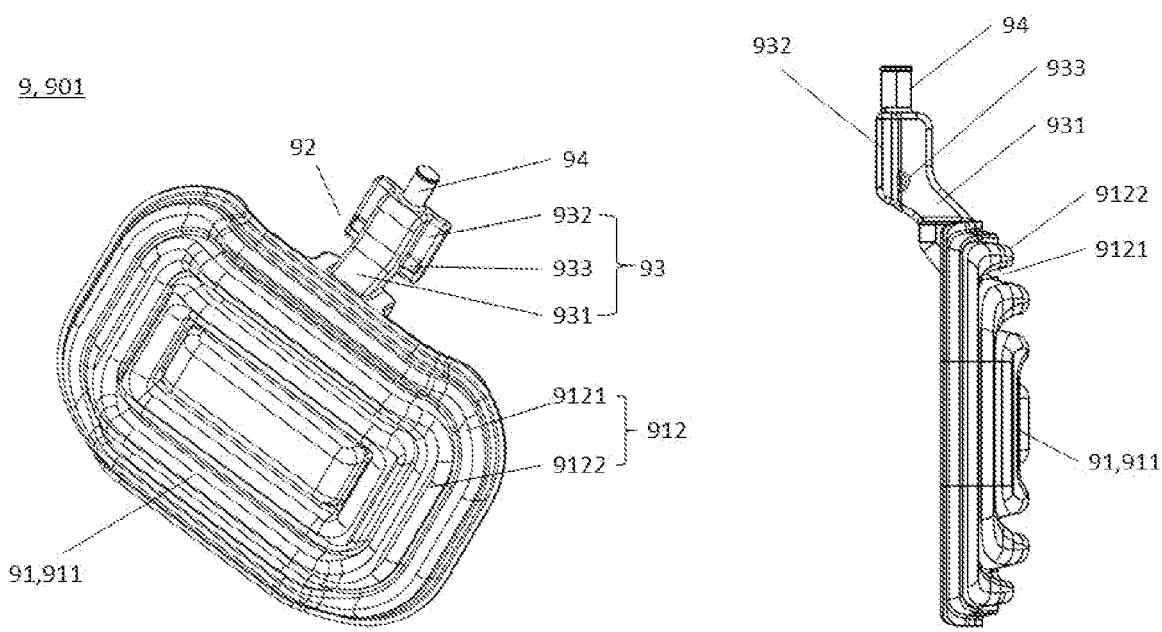
Fig. 31
Fig. 32

CONNECTING STRUCTURE AND SEAT

CROSS REFERENCE TO RELATED APPLICATIONS

The present application is a continuation of PCT/CN2022/072640 filed on Jan. 19, 2022, which claims priority to the Chinese Patent Application No. 202122010236.1 entitled "Extensible Seat", the Chinese Patent Application No. 202122010085.X entitled "Quickly-Inserted Connecting Structure, Seat and Nursing Seat with the Same" and the Chinese Patent Application No. 202122004549.6 entitled "Waist Support for Backrest and Seat", all of the above Chinese patent applications are filed with CNIPA on Aug. 24, 2021, and the contents of the above identified applications are hereby incorporated by reference in their entireties.

TECHNICAL FIELD

The present application relates to the technical fields of household seats and nursing seats, in particular to a connecting structure and a seat.

BACKGROUND ART

At present, there have been many styles of seats on the market. Most of the seats are single in function no matter which materials are adopted. The seats are only in a single service form when being used no matter whether they are folded or assembled, that is, the seats do not have the function that armrests, backrests and supporting legs are simply disassembled or assembled with hands according to specific usage scenarios, and therefore, switching among a cushion, a stool, a chair, an armchair and a round-backed armchair which are at different heights cannot be achieved.

On the other hand, there is no simple and reliable connecting structure for various components of a seat, which limits deformability and flexibility of the seat to a great extent, and thus, the existing seat is limited in function and single in application scenarios.

SUMMARY

In order to solve at least one defect existing in the prior art, the present application provides a connecting structure and a seat.

For solving the technical problems, the present application adopts the technical solutions as below.

First aspect of the present application provides a connecting structure comprising:

a mounting hole structure and a mounting structure correspondingly disposed on two main members to be connected; wherein, a step structure extends downwards and inwards on one side of the mounting hole structure, and two sides of the step structure are provided with limiting clamping points protruding in a direction parallel to an extending direction of the step structure;

the mounting structure is configured to have a column structure, a bottom end of the column structure is provided with a shovel-shaped structure extending in one side of the column structure, and two sides of the shovel-shaped structure are provided with everted protrusions; and when the mounting structure is inserted into the mounting hole structure, the step structure is matched with the shovel-shaped structure, top ends of the everted protrusions are in contact with a lower surface of the step structure, sides of the everted protrusions are matched with the limiting clamping points, and thus, quick connection and disassembly between the two main members to be connected are achieved.

In some embodiments of the present application, the mounting hole structure comprises:

a splicing hole formed in one of the two main members, namely a first main member, and extending towards an inside of the first main member;

a step surface formed on a hole wall of the splicing hole and dividing the hole wall into a first hole wall and a second hole wall; the second hole wall being located on a same side with the step surface and enlarging a size of the splicing hole relative to the first hole wall; and two limiting clamping points formed on two sides of the second hole wall and protruding towards each other in a direction parallel to the step surface, and gaps being formed between the two limiting clamping points and the second hole wall.

In some embodiments of the present application, the mounting structure comprises:

a splicing part disposed on the other main member, namely a second main member, and insertable into the splicing hole; and s the everted protrusions obliquely extending outwards along two sides of a bottom of the splicing part to form a wing-shaped structure; and when the splicing part is inserted into the splicing hole, the top ends of the everted protrusions being abutted with the step surface, and the sides of the everted protrusions being clamped into the gaps between the limiting clamping points and the second hole wall to form interference fit.

In some embodiments of the present application, the splicing part comprises:

the column structure disposed on a to-be-connected end of the second main member, the column structure having a size allowing itself to be inserted into the splicing hole, and extending in a direction away from the second main member; and the shovel-shaped structure obliquely extending from a bottom end of the column structure toward the step surface, to form a shovel shape, and the everted protrusions being disposed on the two sides of the shovel-shaped structure.

In some embodiments of the present application, a rear surface of the shovel-shaped structure is configured to be an insertion guide slope, and the insertion guide slope is formed by oblique extension from a lower edge of the column structure toward the step surface.

In some embodiments of the present application, a depth of a hole wall, namely a third hole wall, of the splicing hole in an opposite side of the step surface is smaller than or equal to a depth of the first hole wall; and an upper end of the insertion guide slope is provided with a transverse limiting protrusion, and when the splicing part is inserted into the splicing hole, the transverse limiting protrusion is in snap-fit with an edge of the third hole wall.

Second aspect of the present application provides a seat comprising:

a plurality of connecting structures according to any one mentioned as above, a cushion and a backrest, wherein the backrest is detachably connected to the cushion via one of the connecting structures.

In some embodiments of the present application, the seat further comprises an armrest, and the armrest is detachably connected to the cushion via one of the connecting structures.

In some embodiments of the present application, the seat specifically comprises: a cushion, a surface of the cushion being provided with a plurality of mounting hole structures;

at least one backrest, each backrest being detachably connected to one of the mounting hole structures on the cushion via the mounting structure disposed on a lower portion of each backrest, when outward acting force is applied to the backrest, the mounting hole structure being buckled with the mounting structure of the backrest; and when inward acting force is applied to the backrest, the mounting hole structure being separated from the mounting structure of the backrest, and thus, quick connection and disassembly between each backrest and the cushion are achieved; and at least one armrest, each armrest being detachably connected to one of the mounting hole structures on the cushion via the mounting structure disposed on a lower portion of each armrest, when outward acting force is applied to the armrest, the mounting hole structure being buckled with the mounting structure of the armrest; and when inward acting force is applied to the armrest, the mounting hole structure being separated from the mounting structure of the armrest, and thus, quick connection and disassembly between each armrest and the cushion are achieved.

In some embodiments of the present application, the seat further comprises a plurality of supporting legs, threaded mounting holes for mounting the supporting legs are formed in a lower surface of the cushion, and the supporting legs are connected to the threaded mounting holes via screw threads.

In some embodiments of the present application, each threaded mounting hole comprises a threaded locking structure and a limiting platform.

In some embodiments of the present application, one end of each of the supporting legs is provided with a threaded head, a positioning structure is disposed on one side of a root plane of the threaded head, two clamping protrusions are disposed on an outer side of the limiting platform, a gap is formed between the two clamping protrusions, and the positioning structure is clamped in the gap to limit a threaded connection.

In some embodiments of the present application, the supporting legs are set to have different lengths, and when the lengths of the supporting legs are greater than a preset length, through hole structures used for connecting two supporting legs are disposed in middles of the supporting legs.

In some embodiments of the present application, each supporting leg is provided with an elastic non-slip pad capable of automatic leveling, the elastic non-slip pad is rotatably sleeved on a bottom end of each supporting leg, and the elastic non-slip pad is provided with a supporting plane in contact with the ground.

In some embodiments of the present application, a bottom of the cushion is provided with first force supporting pieces disposed at a rear of the cushion and close to two sides of the mounting hole structure for the backrest as well as second force supporting pieces and third force supporting pieces respectively disposed around the bottom of the cushion; and the second force supporting pieces and the third force supporting pieces are symmetrically disposed along a central axis of the cushion respectively, and the first force supporting pieces, the second force supporting pieces and the third force supporting pieces form a protruding structure serving as a highest part at the bottom of the cushion and are located on a same plane, thereby forming stable planar support for the cushion.

Compared with the prior art, the present application has the beneficial effects that:

1. in the present application, by disposing the mounting hole structure and the mounting structure which are matched and can be respectively disposed on the two main members to be connected, quick assembly and disassembly, with hands, between the two main members to be connected are achieved, and complexity in disassembling the seat with a tool during use is lowered;

2. in the present application, the mounting hole structure and the mounting structure are applied to the seat, quick disassembly and assembly among all components of the seat can be achieved, and therefore, a user can extend the seat to be a leg-free seat, a seat with different heights, or an armchair, a round-backed armchair, etc.;

3. the present application provides a cushion which can be used alone and is integrally formed by using a blow molding process, the cushion can be used alone, can be used without supporting legs, can be provided with the backrests or the armrests or can be of a double backrests seat or a round-backed armchair with four backrests, can meet different demands of the user in different scenarios and can be used in scenarios such as the outdoor, nursing, daily life, a tent, camping, a heatable brick bed, a tatami, and the ground;

4. the present application provides a cushion having a special function, the bottom of the cushion can be provided with a collecting box, and therefore, the cushion can be used in the field of nursing; and meanwhile, the collecting box is slidably connected to the cushion so as to be conveniently handled;

5. the collecting box provided by the present application is of an integrally formed structure in which an upper cover and a lower box are formed by segmentation, and therefore, the collecting box can be wholly covered to form a flat upper surface of the seat when being not needed; and 6. in the present application, by mounting a compressive waist support or an expansive waist support, the comfort level of the seat during use is improved.

BRIEF DESCRIPTION OF DRAWINGS

FIG. 1 is a schematic structural diagram from a top view of a mounting hole structure in an embodiment of the present application;

FIG. 2 is a schematic structural diagram from a bottom view of the mounting hole structure in the embodiment of the present application;

FIG. 3 is a first schematic structural diagram of a mounting structure in an embodiment of the present application;

FIG. 4 is a second schematic structural diagram of the mounting structure in the embodiment of the present application;

FIG. 5 is a schematic structural diagram showing that the mounting structure is plugged in the mounting hole structure in an embodiment of the present application;

FIG. 26 is a front view of a backrest in an embodiment of the present application;

FIG. 27 is a side view of the backrest in the embodiment of the present application;

FIG. 28 is a front view of an armrest in an embodiment of the present application;

FIG. 29 is a side view of the armrest in the embodiment of the present application;

FIG. 30 is a schematic structural diagram of supporting legs in an embodiment of the present application;

FIG. 31 is a perspective view of an expansive waist support in an embodiment of the present application;

FIG. 32 is a side view of the expansive waist support in the embodiment of the present application;

Figure 6:
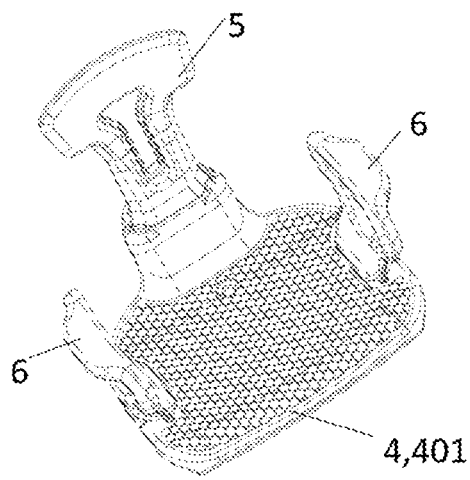
FIG. 6 is a perspective view of a leg-free seat in an embodiment of the present application.

1, main member; 101, first main member; 102, second main member; 11, bottom plane;

2, mounting hole structure; 201, step structure; 21, splicing hole; 211, first hole wall; 212, second hole wall; 22, step surface; 213, third hole wall; 23, limiting clamping point;

3, mounting structure; 31, splicing part; 311, column structure; 3111, force-bearing plane; 312, shovel-shaped structure; 3121, insertion guide slope; 3122, transverse limiting protrusion; 32, everted protrusion;

4, cushion; 41, first force supporting piece; 42, second force supporting piece; 43, third force supporting piece; 44, supporting leg fixing structure; 441, threaded mounting hole; 4411, threaded locking structure; 4412, limiting platform; 4413, clamping protrusion; 45, drainage through hole; 401, first cushion; 4011, protruding part; 402, second cushion; 403, third cushion; 4031, seat base; 4032, through hole; 4033, supporting structure; 4034, accommodating space; 4035, protrusion limiting track;

5, backrest; 51, connecting hole; 511, upper part of connecting hole; 512, lower part of connecting hole; 52, positioning groove;

6, armrest;

7, supporting leg; 71, first supporting leg; 72, second supporting leg; 73, third supporting leg; 74, fourth supporting leg; 701, through hole structure; 702, elastic non-slip pad; 7021, supporting plane; 703, threaded head; 704, positioning structure;

8, collecting box; 81, upper cover; 82, lower box; 83, groove; 84, first handle; 85, second handle; 86, anti-wave groove;

9, waist support; 91, main body; 911, stress surface; 912, folded structure; 9121, first annular gyrus structure; 9122, second annular gyrus structure; 92, connecting piece; 93, buckle structure; 931, supporting part; 932, fixing tail; 933, positioning part; 94, intake nozzle; 901, expansive waist support; and 902, compressive waist support.

DETAILED DESCRIPTION OF THE EMBODIMENTS

The technical solutions in specific embodiments of the present application will be described in detail below with reference to the accompanying drawings. Apparently, the described embodiments are only a part, but not all, of implementations of the overall technical solution in the present application. Based on the overall concept of the present application, all other embodiments obtained by those skilled in the art shall fall within the protection scope of the present application.

It should be noted that, in the description of the present application, directional or positional relationships indicated by terms such as "center", "upper", "lower", "front", "rear", "vertical", "horizontal", "top", "bottom", "inner", and "outer" are based on directional or positional relationships as shown in the accompanying drawings, and are only for the purposes of facilitating and simplifying the descriptions, rather than indicating or implying that the referred apparatus or element has to have a specific direction or be constructed and operated in the specific direction, and therefore, they cannot be regarded as limitations on the present application.

In the description of the present application, it can be understood that the "upper surface" of a cushion refers to a seat base allowing a user to sit; and the "lower surface" of the cushion refers to a surface of the other side opposite to the "upper surface".

Terms "first", "second", "third" and "fourth" in present application are for descriptive purposes only, and cannot be understood as indicating or implying the relative importance or implicitly indicating the number of indicated technical features. Therefore, the features defined as "first", "second", "third" and "fourth" may explicitly or implicitly comprise at least one of the features.

In the description of the present application, it needs to be noted that the terms "mounting", "connected" and "connection" should be understood in a broad sense, for example, "connection" may be fixed connection or detachable connection or an integral whole, may be direct connection or indirect connection through an intermediate medium, and may be inter communication between two elements, unless it may be clearly defined and limited otherwise. For those skilled in the art, the specific meanings of the above terms in present application may be understood according to specific situations.

The present application will be described below with reference to the accompanying drawings and embodiments.

Embodiment 1

Embodiment 1 provides a connecting structure which can be used for detachable connection between two main members to be connected. The connecting structure comprises a mounting hole structure 2 and a mounting structure 3 correspondingly disposed on two main members 1 to be connected.

As shown in FIG. 1 and FIG. 2, the mounting hole structure 2 comprises:
a splicing hole 21 formed in one of the two main members 1, namely a first main member 101, and extending towards an inside of the first main member 101; the splicing hole 21 may penetrate through the first main member 101;
a step surface 22 formed on a hole wall of the splicing hole 21 and dividing the hole wall into a first hole wall 211 and a second hole wall 212; the second hole wall 212 being located on a same side with the step surface 22 and enlarging a size of the splicing hole 21 relative to the first hole wall 211; and
two limiting clamping points 23 formed on two sides of the second hole wall 212, the two limiting clamping points 23 are protruding towards each other in a direction parallel to the step surface 22, and a gap is formed between each of the two limiting clamping points 23 and the second hole wall 212.

As shown in FIG. 3 to FIG. 5, the mounting structure 3 comprises:
a splicing part 31 disposed on the other main member 1, namely a second main member 102, and insertable into the splicing hole 21; and
everted protrusions 32 obliquely extending outwards along two sides of a bottom of the splicing part 31 to form a wing-shaped structure; and when the splicing part 31 is inserted into the splicing hole 21, top ends of the everted protrusions 32 being abutted with the step surface 22, and sides of the everted protrusions 32 being clamped into the gaps between the limiting clamping points 23 and the second hole wall 212 to form interference fit.

The present embodiment provides a connecting structure which is simply in structure. By respectively disposing the mounting hole structure 2 and the mounting structure 3 on the two main members 1 to be connected, when the two main members 1 need to be connected, it is only necessary to insert the splicing part 31 of the mounting structure 3 into the splicing hole 21 of the mounting hole structure 2, and the everted protrusions 32 are clamped between the step surface 22 and the limiting clamping points 23 to achieve stable connection and quick disassembly and assembly for the two main members 1. It can be understood that structures of the first main member 101 and the second main member 102 are unlimited in the present embodiment, and FIGS. 1 to 5 only shows a part of the first main member 101 and a part of the second main member 102.

Further, as shown in FIG. 3 and FIG. 4, the splicing part 31 comprises:
a column structure 311 disposed on a to-be-connected end of the second main member 102, having a size allowing the column structure to be inserted into the splicing hole 21, and extending in a direction away from the second main member 102; generally, a width of the column structure 311 being slightly smaller than a width between the first hole wall 211 and a hole wall at an opposite side of the first hole wall 211 so that the column structure 311 may be smoothly inserted into the spicing hole 21; and
a shovel-shaped structure 312 obliquely extending from a bottom end of the column structure 311 toward the step surface 22, to form a shovel shape, and the everted protrusions 32 being disposed on two sides of the shovel-shaped structure 312.

When the mounting structure 3 is inserted into the mounting hole structure 2, the shovel-shaped structure 312 is adjacent to the second hole wall 212 of the splicing hole 21, the top ends of the everted protrusions 32 are in contact fit with the step surface 22, the sides of the everted protrusions 32 are clamped by the limiting clamping points 23, and thus, quick connection and disassembly between the two main members 1 to be connected are achieved.

A rear surface of the shovel-shaped structure 312, that is, a surface facing away from the step surface 22 after the splicing part 31 is inserted into the splicing hole, is configured to be an insertion guide slope 3121, and the insertion guide slope 3121 is formed by oblique extension from a lower edge of the column structure 311 toward the step surface 22, and the insertion guide slope 3121 forms a wedge effect with a force-bearing plane 3111 of the mounting structure connected to a front side of the shovel-shaped structure.

It can be understood that the everted protrusions 32 disposed on the two sides of the shovel-shaped structure 312 need to be abutted with the step surface 22, and therefore, the everted protrusions 32 inevitably protrude relative to the column structure 311 in a width direction; if the splicing part 31 is perpendicularly inserted into the splicing hole 21, it will not be smoothly inserted, from this, the insertion guide slope 3121 is arranged to guide the splicing part 31 to be obliquely inserted into the splicing hole 21 along the insertion guide slope 3121, and thus, the shovel-shaped structure 312 and the everted protrusions 32 are smoothly inserted into the splicing hole 21. In a case that the second main member 102 bears an outward thrust, the column structure 311 naturally descends under the guide of the insertion guide slope 3121, and the sides of the everted protrusions 32 on the two sides of the shovel-shaped structure 312 are pushed over the limiting clamping points to form interference fit.

Further, as shown in FIG. 2, a depth of a hole wall, namely a third hole wall 213, of the splicing hole 21 in an opposite side of the step surface 22 is smaller than or equal to a depth of the first hole wall 211.

As shown in FIG. 4, an upper end of the insertion guide slope 3121 is provided with a transverse limiting protrusion 3122, and when the splicing part 31 is inserted into the splicing hole 21, the transverse limiting protrusion 3122 is in snap-fit with an edge of the third hole wall 213, thereby further playing a role in limiting the mounting structure 3.

Optionally, each of the mounting structure 3 and the mounting hole structure 2 is integrally formed with one of the main members 1 correspondingly connected thereto; that is, the mounting hole structure 2 and the first main member 101 are of an integrally formed structure, and the mounting structure 2 and the second main member 102 are of an integrally formed structure in the present embodiment.

Specifically, the splicing hole 21 of the mounting hole structure 2 may be a rectangular hole, and correspondingly, the mounting structure 311 of the mounting structure 3 is a rectangular column structure.

Embodiment 2

On the basis of the connecting structure provided in embodiment 1, as shown in FIG. 6 to FIG. 15, the present embodiment provides an extensible seat comprising a plurality of connecting structures as that in embodiment 1, a cushion 4 (referring to FIG. 16 to FIG. 23), and a backrest 5 (referring to FIG. 26 and FIG. 27), wherein the backrest 5 is detachably connected to the cushion 4 via one of the connecting structures.

Further, the seat further comprises an armrest 6 (referring to FIG. 28 and FIG. 29), and the armrest 6 is detachably connected to the cushion 4 via one of the connecting structures.

Further, the seat further comprises a plurality of supporting legs 7 (referring to FIG. 30).

Specifically, the extensible seat provided in the present embodiment comprises:
a cushion 4, a surface of the cushion 4 being provided with a plurality of mounting hole structures 2;
at least one backrest 5, each backrest 5 being detachably connected to one of the mounting hole structures 2 on the cushion 4 via the mounting structure 3 disposed on a lower portion of each backrest, when outward force is applied to the backrest 5, the mounting hole structure 2 being buckled with the mounting structure 3 of the backrest; and when inward force is applied to the backrest 5, the mounting hole structure 2 being separated from the mounting structure 3 for the backrest, and thus, quick connection and disassembly between each backrest 5 and the cushion 4 are achieved; and
at least one armrest 6, each armrest 6 being detachably connected to one of the mounting hole structures 2 on the cushion 4 via the mounting structure 3 disposed on a lower portion of the armrest, when outward force is applied to the armrest 6, the mounting hole structure 2 being buckled with the mounting structure 3 of the armrest; and when inward force is applied to the armrest 6, the mounting hole structure 2 being separated from the mounting structure 3 of the armrest, and thus, quick connection and disassembly between each armrest 6 and the cushion 4 are achieved.

It can be understood that the mounting hole structures 2 on the surface of the cushion 4 are disposed to correspond to a position where the backrest 5 or the armrest 6 is desired to be mounted and are generally disposed on a peripheral side of the surface of the cushion 4; and the above-mentioned "outward" or "inward" force is described with respect to a user sitting on the seat.

By means of cooperation between each mounting hole structure 2 and each mounting structure 3 of the above-mentioned seat, quick disassembly and assembly between the cushion 4 and other components such as the backrest 5 and the armrest 6 are achieved, so that the seat is capable of structurally deforming and extending according to the demand and preference of a user, better in flexibility, and more suitable for different crowds. Optionally, the backrest 5 and the armrest 6 in the present embodiment are integrally formed by using a blow-molding process.

Specific structures of the mounting hole structures 2 and the mounting structures 3 used in the seat provided in the present embodiment are the same as those in embodiment 1, and thus will not be described repeatedly herein.

A process that each mounting structure 3 on the lower portion of each backrest 5 or armrest 6 and each mounting hole structure 2 on the surface of the cushion 4 are matched with each other is described as follows: in a case that the armrest 6 or the backrest 5 bear a thrust applied to an outer side of the cushion 4 in a use state, the splicing part 31 naturally descends under the guide of the insertion guide slope 3121 and pushes the sides of the everted protrusions 32 on two sides of the shovel-shaped structure 312 over the limiting clamping point 23 in the splicing hole 21 to form interference fit, and meanwhile, the transverse limiting protrusion 3122 on the insertion guide slope 3121 also forms snap fit with the edge of the third hole wall 213 of the splicing hole 21, thus, the mounting structure 3 and the mounting hole structure 2 are connected in a state that is not easily separated out; and meanwhile, the force-bearing plane 3111 of the column structure 311 and a bottom plane 11 of each armrest 6 or backrest 5 are matched with the hole wall of the splicing hole 21 of the cushion 4 and a contact surface at a periphery of the splicing hole 21 in the upper surface of the cushion 4 respectively to bear a force, and thus, a stable supporting structure is formed. When the thrust is applied to the armrest 6 or backrest 5 reversely, that is, a direction facing an inner side of the cushion 4, the everted protrusions 32 on two sides of the shovel-shaped structure 312 are naturally separate with the limiting clamping point 23 in the splicing hole 21 so that the armrest 6 or backrest 5 can be pulled out by upwards applying a force.

Figure 17:
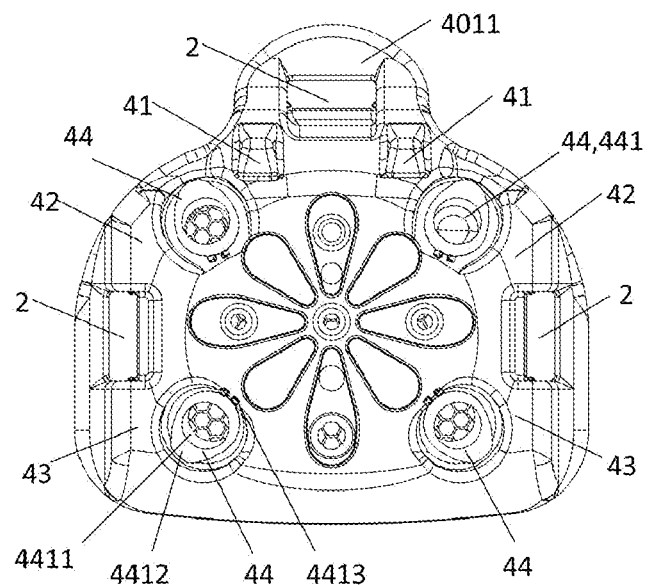
FIG. 17 is a bottom view of the first cushion in the embodiment of the present application.

Further, as shown in FIG. 17, a bottom of the cushion 4 is provided with first force supporting pieces 41 disposed at a rear of the cushion 4 and close to two sides of the mounting hole structure 2 for the backrest 5 as well as second force supporting pieces 42 and third force supporting pieces 43 respectively disposed around the bottom of the cushion 4; and the second force supporting pieces 42 and the third force supporting pieces 43 are symmetrically disposed along a central axis of the cushion 4 respectively, and the first force supporting pieces 41, the second force supporting pieces 42 and the third force supporting pieces 43 are formed into a protruding structure serving as a highest part at the bottom of the cushion 4 and are located on a same plane, thereby forming stable planar support for the cushion 4. By means of the above-mentioned structures, the seat may be achieved to be a leg-free seat.

Further, the seat may further comprises a plurality of supporting legs 7, and the bottom of the cushion 4 is provided with supporting leg fixing structures 44 for mounting the supporting legs 7. The supporting legs 7 can be mounted on the lower part of the cushion 4 as required.

It can be understood that the supporting leg fixing structures 44 have no influences on functions of the first force supporting pieces 41, the second force supporting pieces 42 and the third force supporting pieces 43, that is, the force supporting pieces are higher than the supporting leg fixing structures, and thus, components in contact with the ground are always the force supporting pieces.

Figure 20:
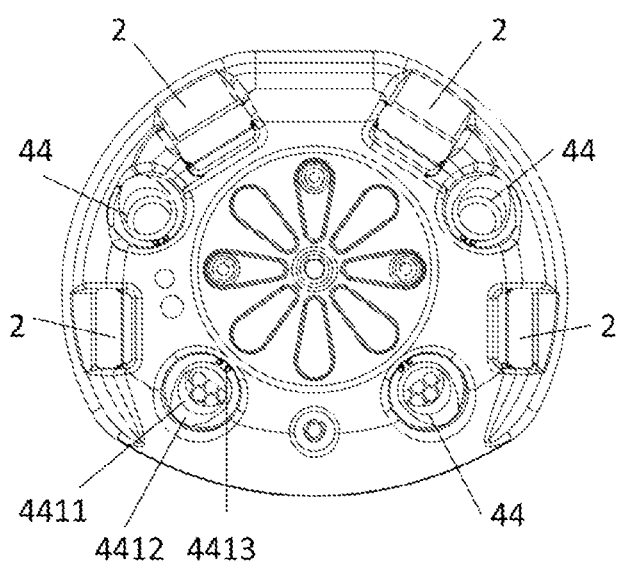
FIG. 20 is a bottom view of the second cushion in the embodiment of the present application.
Figure 21:
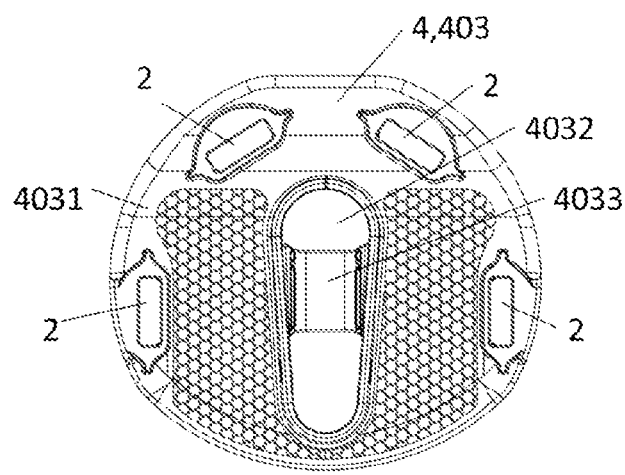
FIG. 21 is a top view of a third cushion in an embodiment of the present application.
Figure 22:
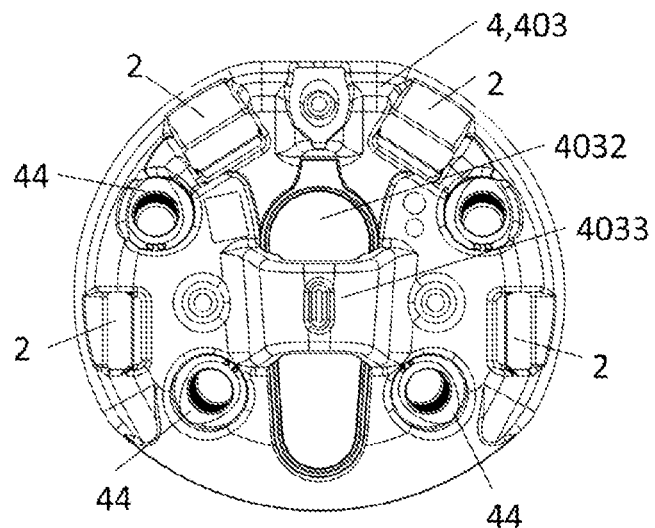
FIG. 22 is a bottom view of the third cushion in the embodiment of the present application.
Figure 23:
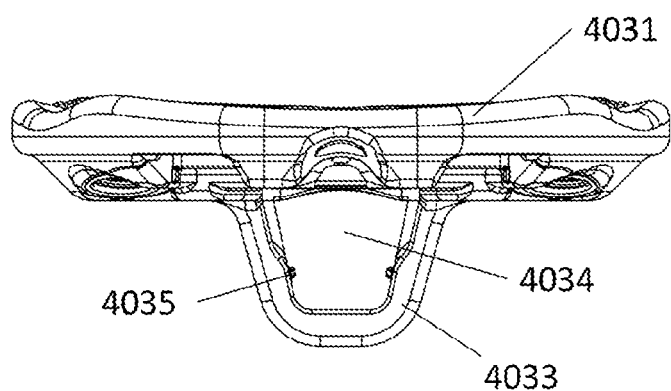
FIG. 23 is a front view of the third cushion in the embodiment of the present application.

As shown in FIG. 17, FIG. 20 and FIG. 22, each of the supporting leg fixing structures 44 comprises a threaded mounting hole 441 deposed on a lower surface of the cushion 4, and the threaded mounting hole 441 is connected to one of the supporting legs 7 via screw thread. The threaded mounting hole 441 comprises a threaded locking structure 4411 and a limiting platform 4412. The threaded locking structure 4411 is a screw thread disposed on an inner surface of the threaded mounting hole 441; and the limiting platform 4412 is a protruding plane, disposed around the threaded mounting hole 441, on the lower surface of the cushion 4 and is used for limiting the screw-in depths of the supporting legs 7.

One end of each of the supporting legs 7 is provided with a threaded head 703, and the threaded head 703 can be mounted on the threaded locking structure 4411 of the cushion 4.

Further, as shown in FIG. 30, a positioning structure 704 is disposed on one side of a root plane of the threaded head 703, two clamping protrusions 4413 are disposed on an outer side of the limiting platform 4412, a gap is formed between the two clamping protrusions 4413, and the positioning structure 704 may be clamped in the gap to limit a threaded connection. When the supporting leg 7 is mounted, the threaded head 703 of the supporting leg 7 is screwed into the threaded locking structure 4411 until the root plane of the threaded head 703 is in contact with the limiting platform 4412, and it is further screwed inwards to make the positioning structure 704 clamped in the gap between the two clamping protrusions 4413 to form physical limitation, so that it is ensured that the threaded connection of the supporting leg 7 cannot be loosened even if the seat is rotated or moved.

In a preferred technical solution, the supporting legs 7 are set to have different lengths, and the supporting legs 7 having the different lengths are provided with the threaded heads 703 having the same size, so that the universality of a threaded connection structure is achieved. The seat can be replaced with the supporting legs 7 having different heights as desired, and thus, the seat may be achieved to have different heights.

Further, when the lengths of the supporting legs 7 are greater than a preset length, through hole structures 701 are disposed in middles of the supporting legs 7. After the supporting legs 7 are mounted on the seat, the connection among the supporting legs can be achieved by means of the through hole structures 701, and thus, the situation that the supporting legs are opened outwards if the body weight of a user is greater may be effectively prevented, and the stability of the seat is improved. There are various specific connection ways such as connection between adjacent supporting legs 7 or connection between two supporting legs 7 on diagonals.

Further, each of the above-mentioned supporting legs 7 is provided with an elastic non-slip pad 702 capable of automatic leveling. The elastic non-slip pad 702 is rotatably sleeved on a bottom end of each supporting leg 7, the elastic non-slip pad 702 is provided with a supporting plane 7201 in contact with the ground, and the elastic non-slip pad 702 can automatically rotate to a corresponding position according to the contact between the supporting plane 7021 and the ground during use, thereby an automatic leveling function is achieved.

As shown in FIG. 30, specifically, the supporting legs 7 comprise a first set of supporting legs 71, a second set of supporting legs 72, a third set of supporting legs 73 and a fourth set of supporting legs 74, each set of supporting legs have different lengths. Bottom ends of the first set of supporting legs 71, the second set of supporting legs 72, the third set of supporting legs 73 and the fourth set of supporting legs 74 are respectively provided with the elastic non-slip pads 702 of which angles may be finely adjusted. Middle sections of the third set of supporting legs 73 and the fourth set of supporting legs 74 are provided with the through hole structures 701 which are integrally formed. The supporting legs 73 and 74 are high, and therefore, by using the through hole structures 701, two adjacent supporting legs of the third set of supporting legs 73 or the fourth set of supporting legs 74 can be connected and fixed by other means.

In the above-mentioned embodiment, by using the supporting leg fixing structures 44 on the bottom of the cushion 4, flexible change of a leg-free chair and a legged chair can be achieved, selective disassembly and assembly of the supporting legs 7 having the different heights are achieved, and it is ensured that the deserved stability and bearing safety of the seat are achieved in any state; and meanwhile, by the mounting hole structures 2 of the cushion 4, the backrest 5 and the armrest 6 can be Zo selectively mounted, different combination states between the cushion 4 and other components are achieved, and selective and simple one-step assembly and disassembly as well as stable and reliable connection among the various components are achieved.

It needs to be noted that the cushion 4 in the above-mentioned seat is integrally formed by blow-molding, may be used alone or used by mounting the supporting legs 7 on the lower portion, and may also be equipped with the backrests 5 or the armrests 6 to form a single backrest structure, a double backrests structure or a four backrests annular structure. The supporting legs 7 may be mounted at different heights, and the above-mentioned structures can meet demands of use in different scenarios such as outdoor, nursing, daily life, a tent, camping, a heatable brick bed, a tatami, and the ground.

Preferably, each of the cushion 4, the backrests 5, the armrests 6 and the supporting legs 7 is set to be of a hollow structure integrally formed by blow-molding. It needs to be noted that the above-mentioned seat is formed by hollow blow-molding, and the components which are integrally formed comprise the cushion 4 as well as the mounting hole structures 2 surrounding the cushion and used for mounting the armrests 6 and the backrests 5 and the supporting leg fixing structures 44 for mounting the supporting legs 7.

Specifically, various extension forms of the extensible seat will be described with reference to two different structural forms of the cushion 4.

Figure 16:
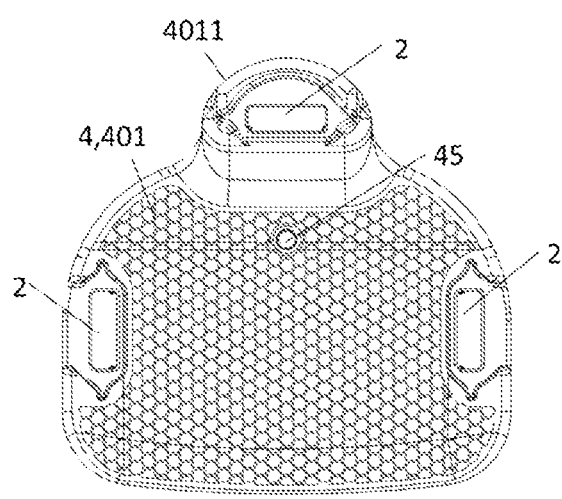
FIG. 16 is a top view of a first cushion in an embodiment of the present application.
Figure 18:
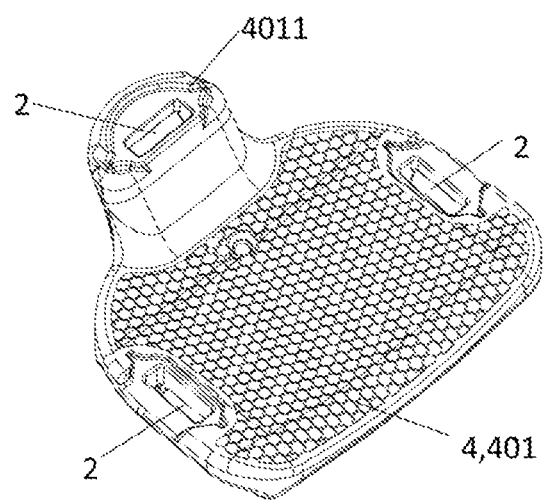
FIG. 18 is a perspective view of the first cushion in the embodiment of the present application.

For a first cushion 401 as shown in FIG. 16 to FIG. 18, a rear side of an upper surface of the first cushion 401 is provided with a protruding part 4011, and the protruding part 4011 is used for mounting the backrest 5 so as to provide a greater backrest use height; and a bottom of the cushion 4 is provided with force supporting pieces 41, 42 and 43, and lower planes of the force supporting pieces 41, 42 and 43 are lower than lower planes at outermost sides of the threaded mounting holes 441.

Figure 7:
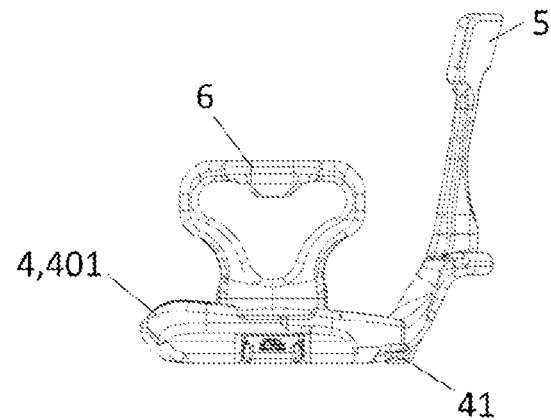
FIG. 7 is a side view of the leg-free seat in the embodiment of the present application.

On the basis of the structure of the first cushion 401, FIG. 6 and FIG. 7 are respectively a perspective view and a side view of a leg-free seat provided in the present embodiment. The leg-free seat comprises a backrest 5 and armrests 6 which are mounted on the first cushion 401, and the leg-free seat utilizes the first force supporting pieces 41 to prevent the entire seat from being overturned due to the backrest 5 being leaned against when the seat is used on the ground or a bed.

Figure 8:
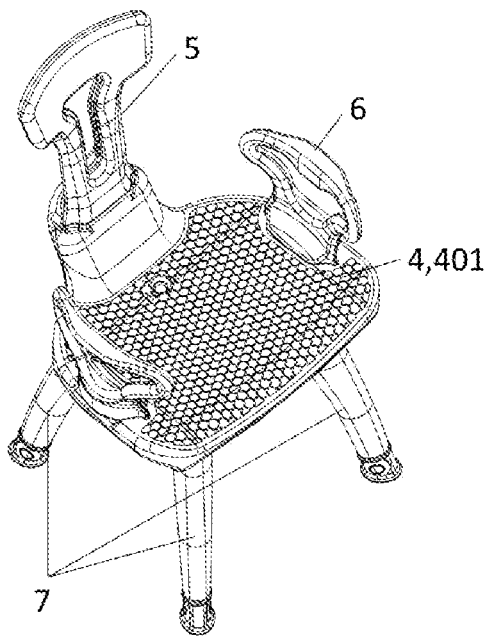
FIG. 8 is a schematic structural diagram of a single-backrest seat in an embodiment of the present application.

As shown in FIG. 8, stools or chairs having different heights and purposes can be formed by mounting the supporting legs having different lengths below the above-mentioned leg-free seat.

Figure 19:
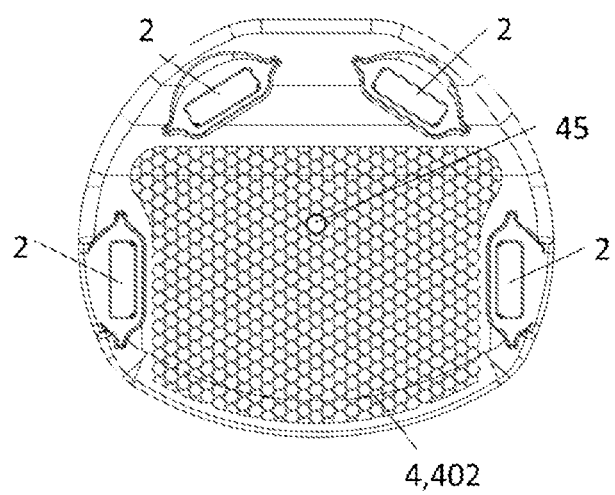
FIG. 19 is a top view of a second cushion in an embodiment of the present application.

FIG. 19 and FIG. 20 are a top view and a bottom view of a second cushion 402 provided in the present embodiment. A rear side of the second cushion 402 is provided with two mounting hole structures 2; and each of two sides of the second cushion 402 is also provided with the mounting hole structure 2.

Figure 9:
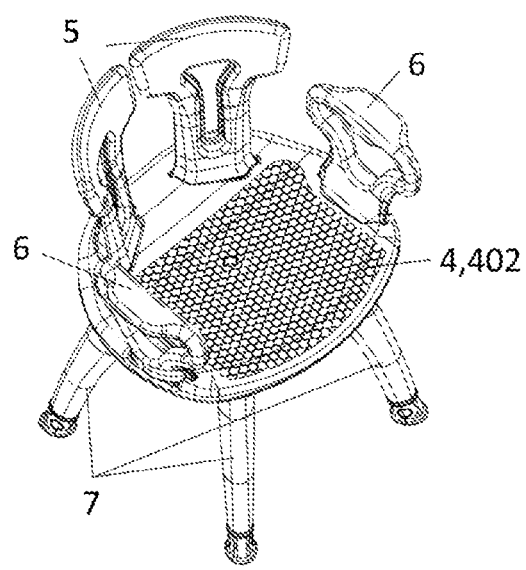
FIG. 9 is a schematic structural diagram of a double-backrest seat in an embodiment of the present application.
Figure 10:
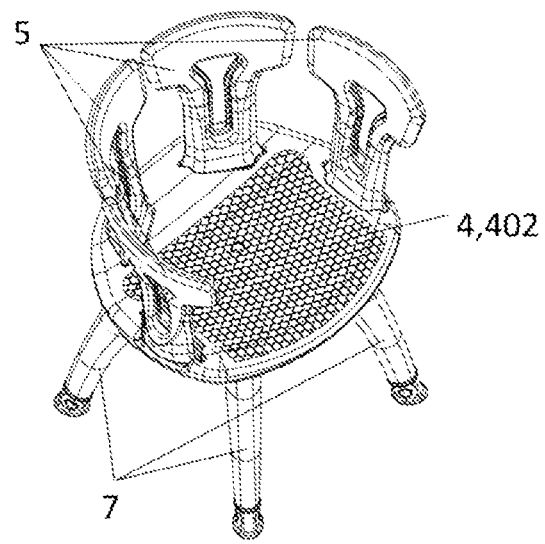
FIG. 10 is a schematic structural diagram of a round-backed armchair in an embodiment of the present application.
Figure 11:
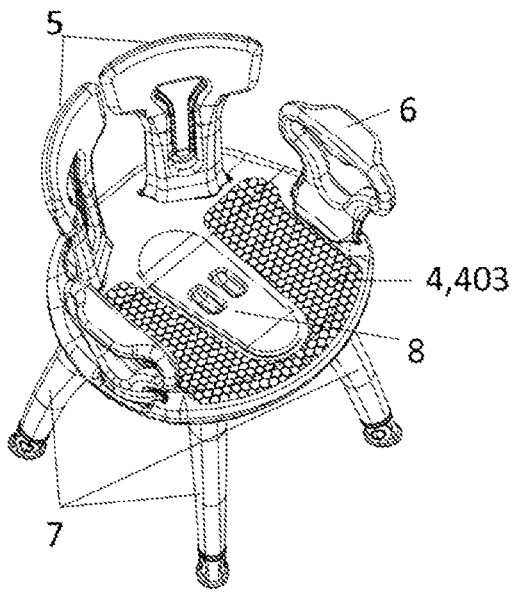
FIG. 11 is a perspective view of a nursing seat in an embodiment of the present application.
Figure 12:
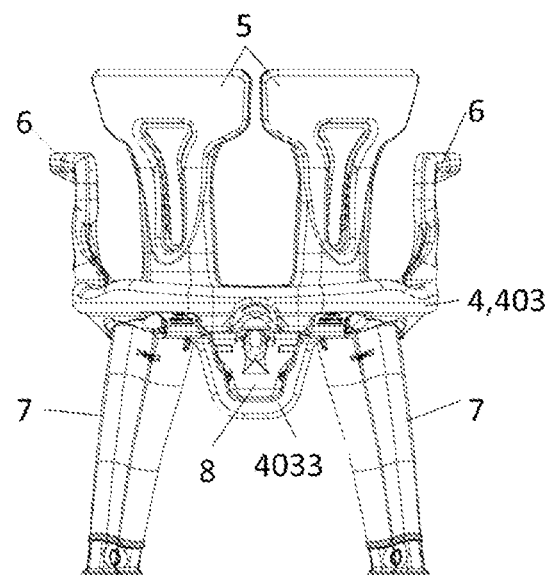
FIG. 12 is a back view of the nursing seat in the embodiment of the present application.
Figure 13:
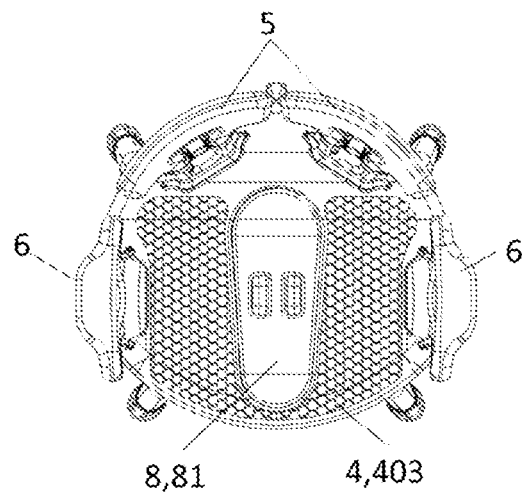
FIG. 13 is a top view of the nursing seat in the embodiment of the present application.
Figure 14:
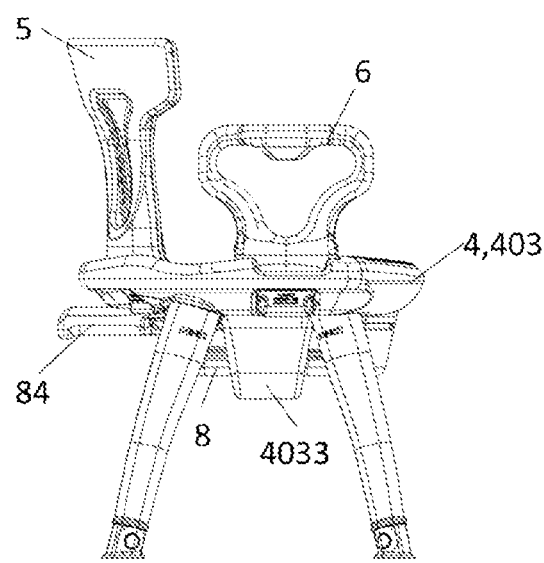
FIG. 14 is a side view of the nursing seat in the embodiment of the present application.

As shown in FIG. 9, for the second cushion 402, the backrests 5 may be respectively mounted in the two mounting hole structures 2 at the rear side, the armrests 6 may be mounted respectively in the mounting hole structures 2 on two sides, and thus, a double-backrest chair is formed; optionally, as shown in FIG. 10, it is also possible to form a round-backed armchair by replacing the armrests 6 with the backrests 5. Besides, for the double-backrest chair and the round-backed armchair, the supporting legs 7 may be selected to be or not be mounted.

For the double backrests combined design of the above-mentioned second cushion 402, a support for the waist and two sides of the waist can be better provided, meanwhile, it is also possible to replace the two armrests with the backrests to form the round-backed armchair, and thus, a more stable upper body supporting effect is achieved by the combination of the four backrests.

The first cushion 401 and the second cushion 402 is provided with a drainage through hole 45 passing through obverse and reverse sides.

Embodiment 3

FIG. 21 to FIG. 24 are respectively a top view, a bottom view and a back view of a third cushion 403 provided in the present embodiment. The third cushion 403 comprises:

a seat base 4031;

a through hole 4032 formed in a middle of the seat base 4031; optionally, a size of the through hole 4032 in a length direction of the seat base 4031 being greater than a size in a width direction of the seat base;

a supporting structure 4033 disposed below the through hole 4032, an accommodating space 4034 being formed between the supporting structure 4033 and the seat base 4031; optionally, the supporting structure 4033 and the seat base 4031 being integrally formed; and a collecting box 8 detachably accommodated in the accommodating space 4034.

Figure 25:
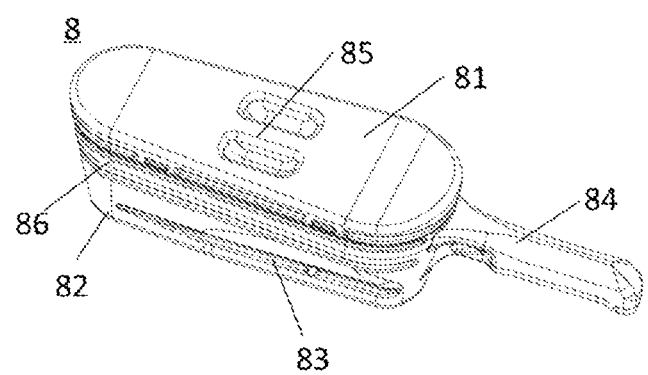
FIG. 25 is a perspective view of the collecting box provided in an embodiment of the present application.
Figure 33:
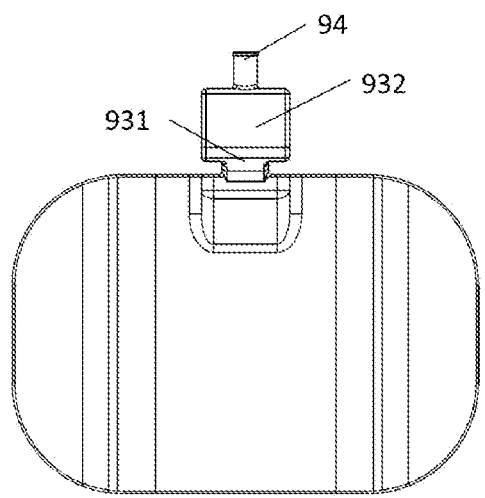
FIG. 33 is a back view of the expansive waist support in the embodiment of the present application.
Figure 34:
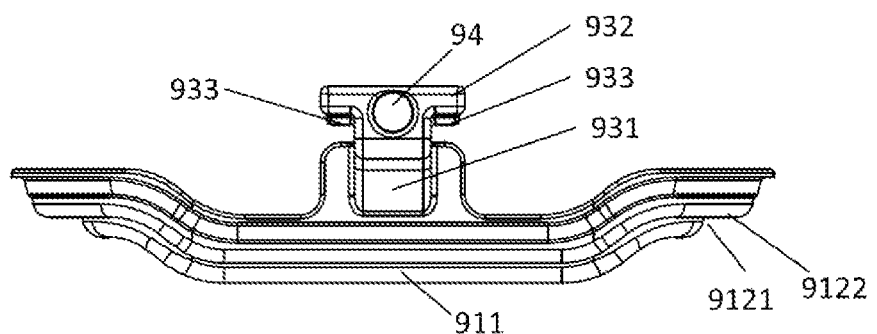
FIG. 34 is a top view of the expansive waist support in the embodiment of the present application.
Figure 35:
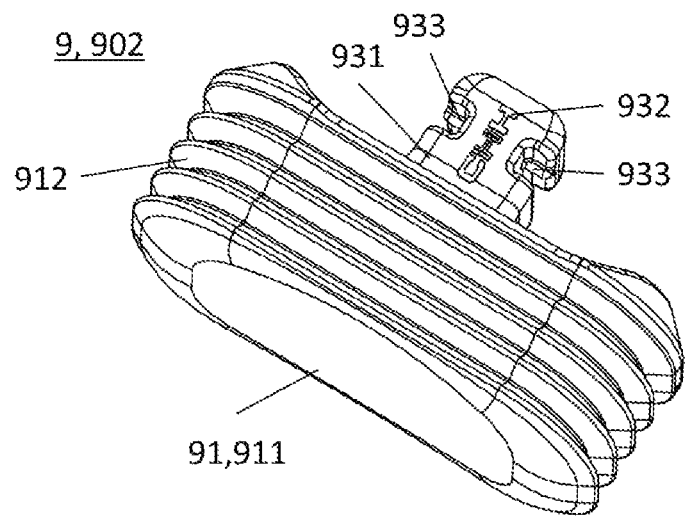
FIG. 35 is a perspective view of a compressive waist support in an embodiment of the present application.
Figure 36:
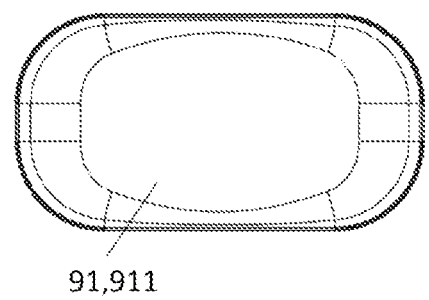
FIG. 36 is a front view of the compressive waist support in the embodiment of the present application.
Figure 37:
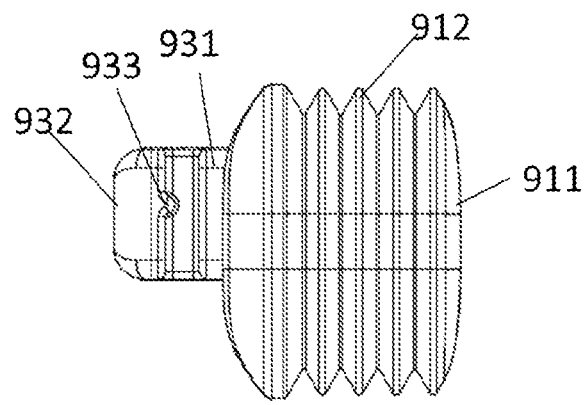
FIG. 37 is a side view of the compressive waist support in the embodiment of the present application.
Figure 38:
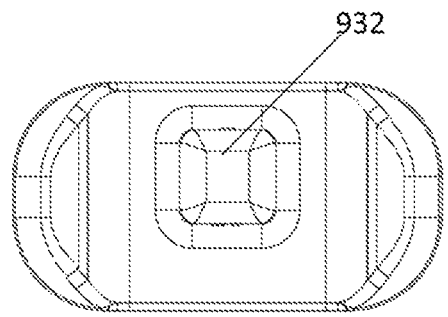
FIG. 38 is a back view of the compressive waist support in the embodiment of the present application.
Figure 39:
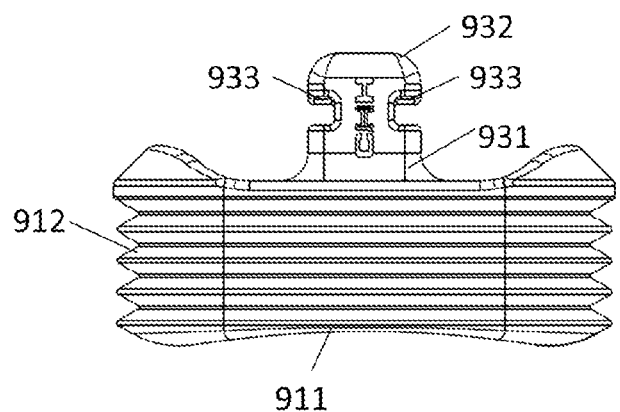
FIG. 39 is a top view of the compressive waist support in the embodiment of the present application.
Figure 40:
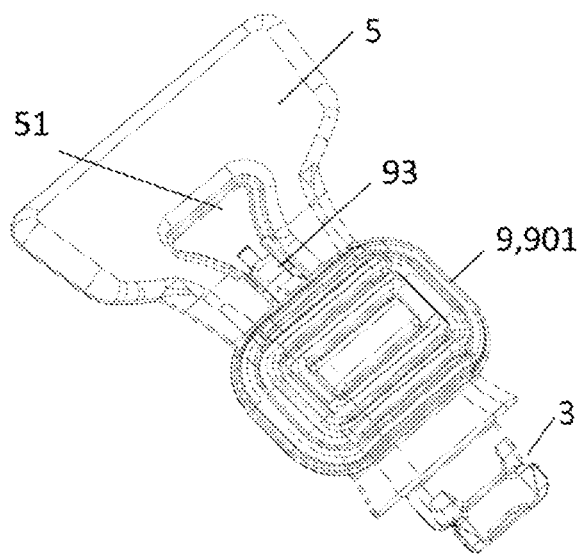
FIG. 40 is a perspective view of a backrest provided with an expansive waist support in an embodiment of the present application.
Figure 41:
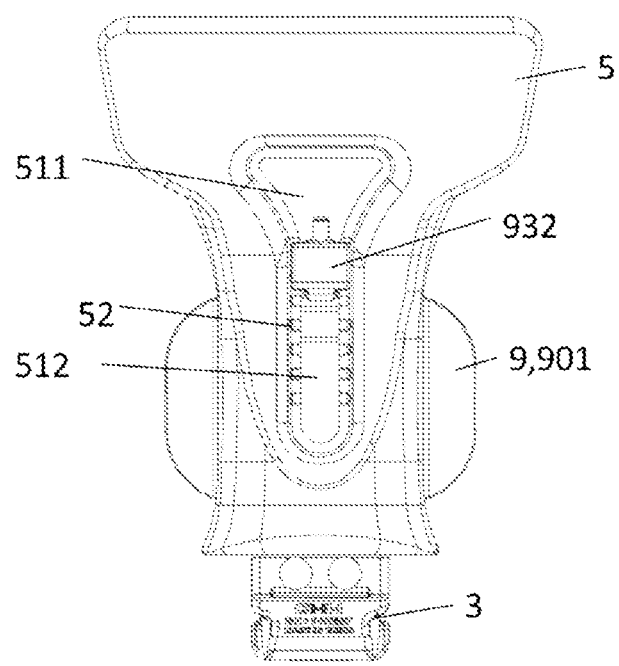
FIG. 41 is a back view of the backrest provided with the expansive waist support in the embodiment of the present application.
Figure 42:
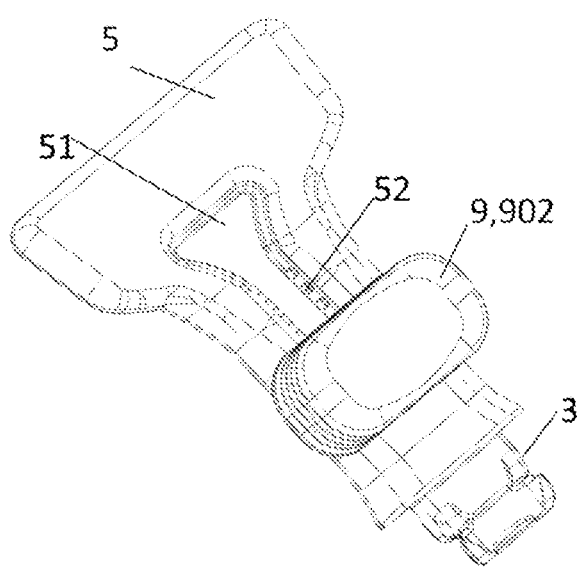
FIG. 42 is a perspective view of a backrest provided with a compressive waist support in an embodiment of the present application.
Figure 43:
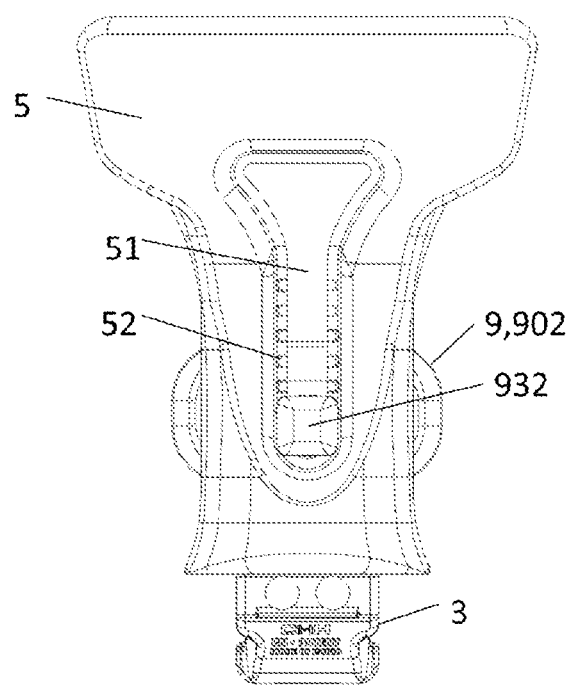
FIG. 43 is a back view of the backrest provided with the compressive waist support in the embodiment of the present application.
Figure 44:
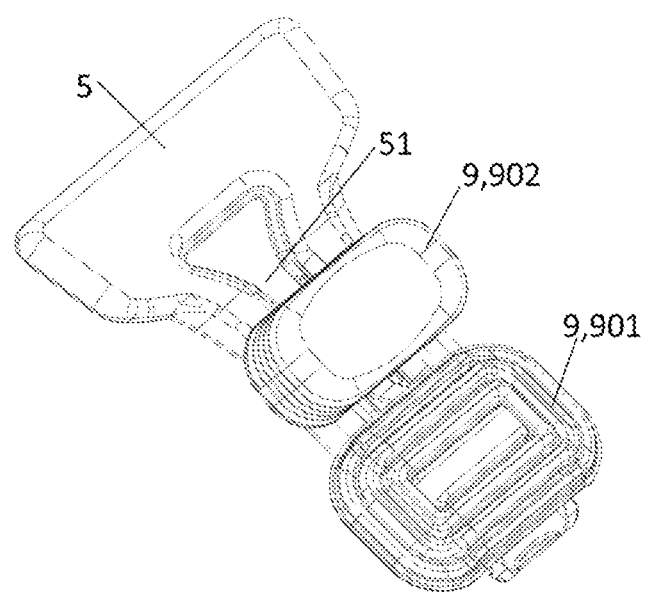
FIG. 44 is a perspective view of a backrest provided with an expansive waist support and a compressive waist support in an embodiment of the present application.

Preferably, as shown in FIG. 25, the collecting box 8 comprises an upper cover 81 and a lower box 82 provided with a collecting cavity, and the upper cover 81 is buckled on the lower box 82. Specifically, the collecting box 8 is formed by segmentation after integrated by blow-molding. Preferably, when the collecting box 8 is put into the accommodating space 4034, the upper cover 81 is flush with the seat base 4031 of the third cushion 403 so that the comfort level during use is guaranteed.

In practical application, the accommodating space 4034 may be molded sunken downwards and opened at two ends in a central axis of the third cushion 403, the collecting box 8 is fixedly mounted in the accommodating space 4034, an upper edge, connected to the third cushion 403, of the accommodating space 4034 is designed to be of a side-leakage-resistant structure obliquely extending towards the accommodating space 4034, the side-leakage-resistant structure may be matched for mounting the upper cover 81 of the collecting box 8, the upper cover 81 of the collecting box 8 will form a consistent seat surface with the seat base 4031 of the third cushion 403 after being mounted on the third cushion 403, and thus, the comfort level during use is guaranteed.

Further, the supporting structure 4033 is provided with protrusion limiting tracks 4035 on two sides inside the accommodating space 4034; correspondingly, grooves 83 matched with the protrusion limiting tracks 4035 are formed on two sides of the collecting box 8 corresponding to the protrusion limiting tracks 4035; and the collecting box 8 is guided and accommodated in the accommodating space 4034 by the cooperation of the grooves 83 and the protrusion limiting tracks 4035.

Further, one end of the lower box 82 is provided with a first handle 84. Specifically, the collecting box 8 is integrally formed and is provided with the integrally formed first handle 84 and the integrally formed upper cover 81, and after being separated from the lower box 82 of the collecting box 8 by means of segmentation, the upper cover 81 may be mounted on either the lower box 82 or a top of the through hole 4032 of the third cushion 403 and may form a unified seat surface with the upper surface of the seat base 4031.

Further, a top of the upper cover 81 is provided with an integrally formed second handle 85 for facilitating opening/closing of the upper cover 81.

Figure 24:
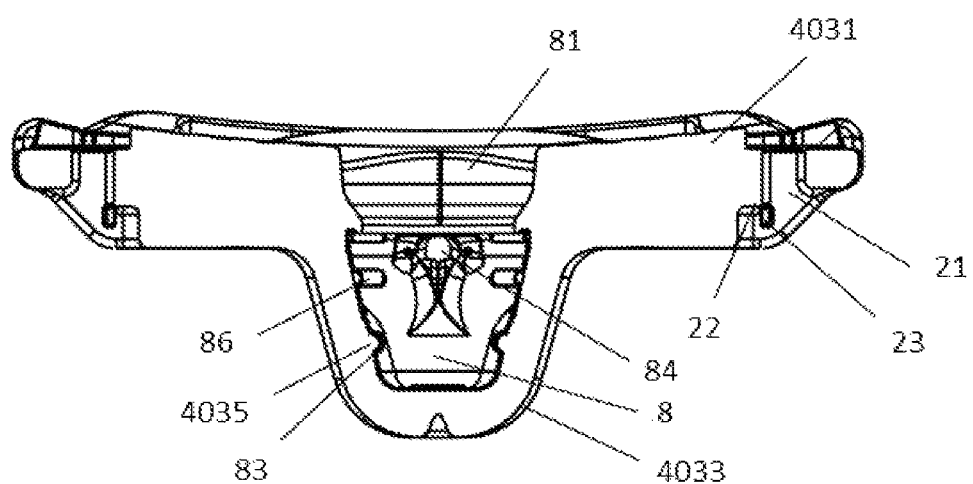
FIG. 24 is a back view of a third cushion provided with a collecting box in an embodiment of the present application.

Optionally, as shown in FIG. 24 and FIG. 25, upper parts of two sides of the lower box 82 are provided with anti-wave grooves 86 protruding towards an inside of the collecting box 8 (sunken inwards on an outer side of the collecting box 8), which is for the purpose that the shake of a liquid level during delivery may be stopped or disturbed by the anti-wave grooves 86 when a liquid is borne in the collecting box 8, so that the liquid is prevented from being splashed outwards.

The third cushion 403 provided with the collecting box 8 in the present embodiment may be used in various nursing seats. It can be understood that the surface of the third cushion 403 may also be provided with a plurality of mounting hole structures 2, moreover, various components of the seat are detachably connected by the connecting structures in embodiment 1 according to the solution in embodiment 2, and thus, seats in different forms are formed. Specific structures of the connecting structures and connection ways of the various components refer to embodiment 1 and embodiment 2, and thus will not be described repeatedly herein.

Figure 15:
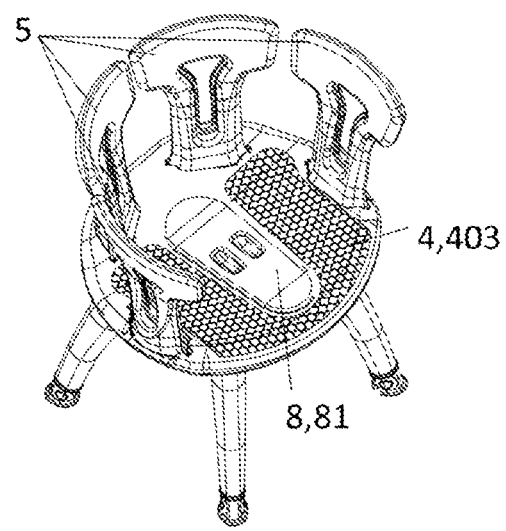
FIG. 15 is a schematic structural diagram of another nursing seat in an embodiment of the present application.

FIG. 11 to FIG. 14 are schematic views showing the final assembly of the third cushion 403 in an embodiment of the present application, in which the third cushion 403 is mounted with two armrests 6, two backrests 5, four supporting legs 7, the collecting box 8 and the upper cover 81 of the collecting box. Optionally, as shown in FIG. 15, the two armrests 6 may also be replaced with two backrests 5 so as to form a round-backed armchair.

Embodiment 4

As shown in FIG. 40 to FIG. 44, the present embodiment provides a backrest provided with a waist support. As shown in FIG. 26, a connecting hole 51 for mounting the waist support 9 is formed in the backrest 5 in a vertical direction. As shown in FIG. 31 to FIG. 39, the waist support 9 comprises:

a main body 91, the main body 91 having a stress surface 911 provided as a surface against which a user leans, the main body 91 being provided with a folded structure 912, and a position of the stress surface 911 in a stress direction being changed by changing a width of the folded structure 912; and a connecting piece 92, the connecting piece 92 being disposed on one side of the main body 91, an end, away from the main body, of the connecting piece 92 being provided with a buckle structure 93, and the connecting piece 92 being buckled to the connecting hole 51 of the backrest 5 via the buckle structure 93.

Further, the buckle structure 93 comprises a supporting part 931 connected to the main body 91 and a fixing tail 932 disposed on the supporting part 931, a width of the fixing tail 932 is greater than a width of a part, connected to the fixing tail 932, on the supporting part 931, and thus, a clamping structure is formed. The fixing tail 932, the supporting part 931 and a surface, located on a same side as the buckle structure 93, of the main body 91 form an I-shaped buckle structure matched with the connecting hole 51 in the backrest 5.

Further, a surface, facing the main body 91, of the fixing tail 932 is provided with positioning parts 933, and the positioning parts 933 are of protruding parts disposed on the surface of the fixing tail 932.

Further, the main body 91 and the connecting piece 92 are of a hollow structure integrally formed by blow-molding, and the connecting piece 92 is provided with an intake nozzle 94 by which the main body may be inflated or deflated to adjust a width of the folded structure 912.

Further, a periphery of the main body 91 is arc-shaped, and a surface, away from the connecting piece 92, of the main body 91 is set to be a plane having a radian. Specifically, a width of an upper part 511 of the connecting hole 51 in the backrest 5 is greater than the width of the fixing tail 932, and a width of a lower part 512 of the connecting hole 51 is smaller than the width of the fixing tail 932, so that the fixing tail 932 of the buckle structure 93 may smoothly penetrate through the connecting hole 51 from the upper part 511 of the connecting hole 51 and move to the lower part 512 of the connecting hole so as to be buckled on a desired position.

Further, a plurality of positioning grooves 52 are vertically formed in side walls of the lower part 512 of the connecting hole at intervals, and the positioning grooves 52 are matched with the positioning parts 933 on the fixing tail 932 to position and adjust the height of the waist support 9. It can be understood that the positioning parts 933 are symmetrically disposed on two sides so as to be respectively buckled with the positioning grooves 52 in the two side walls.

In one embodiment, as shown in FIG. 31 to FIG. 34, the waist support 9 is an expansive waist support 901, and the specific structure of the expansive waist support 901 will be described as follows.

The folded structure 912 of the expansive waist support 901 comprises a first annular gyrus structure 9121 and a second annular gyrus structure 9122 disposed on the stress surface 911. When the expansive waist support 901 is inflated, the first annular gyrus structure 9121 and the second annular gyrus structure 9122 will expand to be unfolded, so that the expansive waist support 901 expands to one side in a forward direction (a direction opposite to the stress direction) to form a supporting structure; and the folded structure is formed by inflating the annular gyrus structures via an intake nozzle 94 to expand on a single side. The width of the folded structure 912 is changed by adjusting the intake quantity, so that the elasticity is adjusted.

The buckle structure 93 comprises the supporting part 931 disposed on a top of the main body 91 and the fixing tail 932 disposed on the supporting part 931, and the width of the fixing tail 932 is greater than the width of a part, connected to the fixing tail 932, on the supporting part 931.

Specifically, the supporting part 931 obliquely and upwards extends from the top of the main body 91 in a direction away from the stress surface 911, and a plane where the fixing tail 932 is located is fundamentally parallel to the stress surface 911; the surface, facing the main body 91, of the fixing tail 932 is provided with protruding positioning parts 933; and the fixing tail 932, the supporting part 931 and a surface, located on the same side as the buckle structure 93, of the main body 91 form an !-shaped buckle structure.

Further, a top end of the fixing tail 932 is provided with the intake nozzle 94 by which the main body 91 may be inflated or deflated to adjust the width of the folded structure 912. The thickness of the expansive waist support can be changed by performing inflation by means of a manual air pump or an electric air pump, so that the effect of changing a supporting condition is achieved.

In another embodiment, as shown in FIG. 31 to FIG. 39, the waist support 9 is a compressive waist support 902. The specific structure of the compressive waist support 902 will be described as follows.

The folded structure 912 of the compressive waist support 902 are stacked folds arranged in a stress direction and may be compressed when the stress surface 911 is stressed and may be rebounded after stressing is ended. For the compressive waist support 902, generally, a certain quantity of gases is inflated into the main body 91 in advance to form a certain pressure therein, and when a user leans against the compressive waist support 902, compressive deformation and elastic support are achieved by means of the folded structure 912.

The buckle structure 93 comprises the supporting part 931 disposed on a rear (a side away from the stress surface) of the main body 91 and the fixing tail 932 disposed on the supporting part 931, and the width of the fixing tail 932 is greater than the width of a part, connected to the fixing tail 932, on the supporting part 931. Specifically, in the present embodiment, the part, connected to the fixing tail 932, on the supporting part 931 is sunken inwards to form a clamping part. The fixing tail 932, the supporting part 931 and a surface, located on a same side as the buckle structure 93, of the main body 91 form an I-shaped buckle structure matched with the connecting hole 51 in the backrest 5.

Further, the surface, facing the main body 91, of the fixing tail 932 is provided with protruding positioning parts 933 to be matched with the positioning grooves 52 in the backrest 5 to position and adjust the height of the waist support 9.

Optionally, it is also possible to detachably mount two or more expansive waist supports 901 or compressive waist supports 902 or a combination of the expansive waist support 901 and the compressive waist support 902 to one backrest 5, thereby improving the comfort level.

The invention claimed is:

1. A connecting structure, comprising: a mounting hole structure and a mounting structure correspondingly disposed on two main members to be connected; wherein
a step structure extends downwards and inwards on one side of the mounting hole structure, and two sides of the step structure are provided with limiting clamping points protruding in a direction parallel to an extending direction of the step structure;

the mounting structure is configured to have a column structure, a bottom end of the column structure is provided with a shovel-shaped structure extending in one side of the column structure, and two sides of the shovel-shaped structure are provided with everted protrusions; and when the mounting structure is inserted into the mounting hole structure, the step structure is matched with the shovel-shaped structure, top ends of the everted protrusions are in contact with a lower surface of the step structure, sides of the everted protrusions are matched with the limiting clamping points, and thus, connection and disassembly between the two main members to be connected are achieved.

2. The connecting structure according to claim 1, wherein the mounting hole structure comprises:

a splicing hole formed in one of the two main members, namely a first main member, and extending towards an inside of the first main member;

a step surface formed on a hole wall of the splicing hole and dividing the hole wall into a first hole wall and a second hole wall; the second hole wall being located on a same side with the step surface and enlarging a size of the splicing hole relative to the first hole wall; and two limiting clamping points formed on two sides of the second hole wall and protruding towards each other in a direction parallel to the step surface, and gaps being formed between the two limiting clamping points and the second hole wall.

3. The connecting structure according to claim 2, wherein the mounting structure comprises:

a splicing part disposed on the other main member, namely a second main member, and insertable into the splicing hole; and the everted protrusions obliquely extending outwards along two sides of a bottom of the splicing part to form a wing-shaped structure; and when the splicing part is inserted into the splicing hole, the top ends of the everted protrusions being abutted with the step surface, and the sides of the everted protrusions being clamped into the gaps between the limiting clamping points and the second hole wall to form interference fit.

4. The connecting structure according to claim 3, wherein the splicing part comprises:

the column structure disposed on a to-be-connected end of the second main member, the column structure having a size allowing itself to be inserted into the splicing hole and extending in a direction away from the second main member; and the shovel-shaped structure obliquely extending from a bottom end of the column structure toward the step surface to form a shovel shape, and the everted protrusions being disposed on the two sides of the shovel-shaped structure.

5. The connecting structure according to claim 4, wherein a rear surface of the shovel-shaped structure is configured to be an insertion guide slope, and the insertion guide slope is formed by oblique extension from a lower edge of the column structure toward the step surface.

6. The connecting structure according to claim 5, wherein a depth of a hole wall, namely a third hole wall, of the splicing hole in an opposite side of the step surface is smaller than or equal to a depth of the first hole wall; and an upper end of the insertion guide slope is provided with a transverse limiting protrusion, and when the splicing part is inserted into the splicing hole, the transverse limiting protrusion is in snap-fit with an edge of the third hole wall.

7. A seat, comprising:

a plurality of connecting structures according to claim 1, a cushion and a backrest, wherein the backrest is detachably connected to the cushion via one of the connecting structures.

8. The seat according to claim 7, wherein further comprises an armrest, and the armrest is detachably connected to the cushion via one of the connecting structures.

9. The seat according to claim 8, further comprising:

the cushion, a surface of the cushion being provided with a plurality of mounting hole structures;

at least one backrest, each backrest being detachably connected to one of the mounting hole structures on the cushion via the mounting structure disposed on a lower portion of each backrest, when outward acting force is applied to the backrest, the mounting hole structure being buckled with the mounting structure of the backrest; and when inward acting force is applied to the backrest, the mounting hole structure being separated from the mounting structure of the backrest, and thus, quick connection and disassembly between each backrest and the cushion are achieved; and at least one armrest, each armrest being detachably connected to one of the mounting hole structures on the cushion via the mounting structure disposed on a lower portion of each armrest, when outward acting force is applied to the armrest, the mounting hole structure being buckled with the mounting structure of the armrest; and when inward acting force is applied to the armrest, the mounting hole structure being separated from the mounting structure of the armrest, and thus, quick connection and disassembly between each armrest and the cushion are achieved.

10. The seat according to claim 9, further comprising a plurality of supporting legs, threaded mounting holes for mounting the supporting legs are formed in a lower surface of the cushion, and the supporting legs are connected to the threaded mounting holes via screw threads.

11. The seat according to claim 10, wherein each threaded mounting hole comprises a threaded locking structure and a limiting platform.

12. The seat according to claim 11, wherein one end of each of the supporting legs is provided with a threaded head, a positioning structure is disposed on one side of a root plane of the threaded head, two clamping protrusions are disposed on an outer side of the limiting platform, a gap is formed between the two clamping protrusions, and the positioning structure is clamped in the gap to limit a threaded connection.

13. The seat according to claim 10, wherein the supporting legs are set to have different lengths, and when the lengths of the supporting legs are greater than a preset length, through hole structures used for connecting two supporting legs are disposed in middles of the supporting legs.

14. The seat according to claim 10, wherein each supporting leg is provided with an elastic non-slip pad capable of automatic leveling, the elastic non-slip pad is rotatably sleeved on a bottom end of each supporting leg, and the elastic non-slip pad is provided with a supporting plane in contact with the ground.

15. The seat according to claim 9, wherein a bottom of the cushion is provided with first force supporting pieces disposed at a rear of the cushion and close to two sides of the mounting hole structure for the backrest as well as second force supporting pieces and third force supporting pieces respectively disposed around the bottom of the cushion; and the second force supporting pieces and the third force supporting pieces are symmetrically disposed along a central axis of the cushion respectively, and the first force supporting pieces, the second force supporting pieces and the third force supporting pieces form a protruding structure serving as a highest part at the bottom of the cushion and are located on a same plane, thereby forming stable planar support for the cushion.

16. A seat, comprising:
  a plurality of connecting structures according to claim 2, a cushion and a backrest, wherein the backrest is detachably connected to the cushion via one of the connecting structures.

17. A seat, comprising:
  a plurality of connecting structures according to claim 3, a cushion and a backrest, wherein the backrest is detachably connected to the cushion via one of the connecting structures.

18. A seat, comprising:
  a plurality of connecting structures according to claim 4, a cushion and a backrest, wherein the backrest is detachably connected to the cushion via one of the connecting structures.

19. A seat, comprising:
  a plurality of connecting structures according to claim 5, a cushion and a backrest, wherein the backrest is detachably connected to the cushion via one of the connecting structures.

20. A seat, comprising:
  a plurality of connecting structures according to claim 6, a cushion and a backrest, wherein the backrest is detachably connected to the cushion via one of the connecting structures.

* * * * *